(12) United States Patent
Sellner et al.

(10) Patent No.: US 6,895,892 B2
(45) Date of Patent: May 24, 2005

(54) SHORT MILK TUBE

(75) Inventors: Duane F. Sellner, Winona, MN (US); Berthold Joharmes Theodorus Dietrich, Gorssel (NL)

(73) Assignee: WestfaliaSurge, Inc., Naperville, IL (US)

(*) Notice: Subject to any disclaimer, the term of this patent is extended or adjusted under 35 U.S.C. 154(b) by 0 days.

(21) Appl. No.: 10/262,561

(22) Filed: Oct. 1, 2002

(65) Prior Publication Data

US 2004/0060520 A1 Apr. 1, 2004

(51) Int. Cl.[7] .................................................. A01J 5/00
(52) U.S. Cl. .................................................. 119/14.54
(58) Field of Search ........................... 119/14.47, 14.5, 119/14.51, 14.54, 650, 651, 670

(56) References Cited

U.S. PATENT DOCUMENTS

| | | | | |
|---|---|---|---|---|
| 1,301,992 A | * | 4/1919 | Anderson | 119/14.54 |
| 2,099,884 A | * | 11/1937 | Green | 119/14.51 |
| 2,341,953 A | * | 2/1944 | Scott | 119/14.51 |
| 2,513,627 A | * | 7/1950 | Dinesen | 119/14.16 |
| 3,079,891 A | * | 3/1963 | Miller | 119/14.5 |
| 3,713,423 A | * | 1/1973 | Sparr, Sr. | 119/670 |
| 3,999,516 A | * | 12/1976 | Shulick | 119/14.1 |
| 4,043,739 A | | 8/1977 | Appel | |
| 4,090,471 A | | 5/1978 | Thompson | |
| 4,196,696 A | * | 4/1980 | Olander | 119/14.51 |
| 4,324,201 A | * | 4/1982 | Larson | 119/14.51 |
| 4,441,454 A | | 4/1984 | Happel et al. | |
| 4,745,881 A | * | 5/1988 | Larson | 119/14.51 |
| 4,869,205 A | * | 9/1989 | Larson | 119/14.51 |
| 5,007,378 A | | 4/1991 | Larson | |
| 5,482,004 A | * | 1/1996 | Chowdhury | 119/14.52 |
| 5,493,995 A | | 2/1996 | Chowdhury | |
| 5,572,947 A | | 11/1996 | Larson et al. | |
| 6,142,098 A | * | 11/2000 | van den Berg | 119/14.51 |
| 6,302,058 B1 | * | 10/2001 | Dahl et al. | 119/14.47 |

FOREIGN PATENT DOCUMENTS

| | | | | |
|---|---|---|---|---|
| NL | WO 9966787 | * | 12/1999 | 119/14.54 |
| WO | WO 99/66787 | | 12/1999 | |
| WO | WO 00/69252 | | 11/2000 | |
| WO | WO 02/07506 A1 | | 1/2002 | |

OTHER PUBLICATIONS

ASAE, Terminology for Milking Machines, Milk Cooling, and Bulk Milk Handling Equipment, S300.3, Jul. 1996, 9pgs.

PCT/ISA/210, International Search Report, received Apr. 5, 2004, 4pgs.

* cited by examiner

*Primary Examiner*—Teri Pham Luu
*Assistant Examiner*—Bret Hayes
(74) *Attorney, Agent, or Firm*—Smith Law Office

(57) ABSTRACT

A short milk tube for providing a conduit between a teat cup assembly and a milker claw that defines a number of ribs that import structural rigidity along a longitudinal axis and in predetermined directions relative to the longitudinal axis to maintain adequate cross-sectional flow area when in the milking position, and a vacuum seal when in the non-milking position.

27 Claims, 3 Drawing Sheets

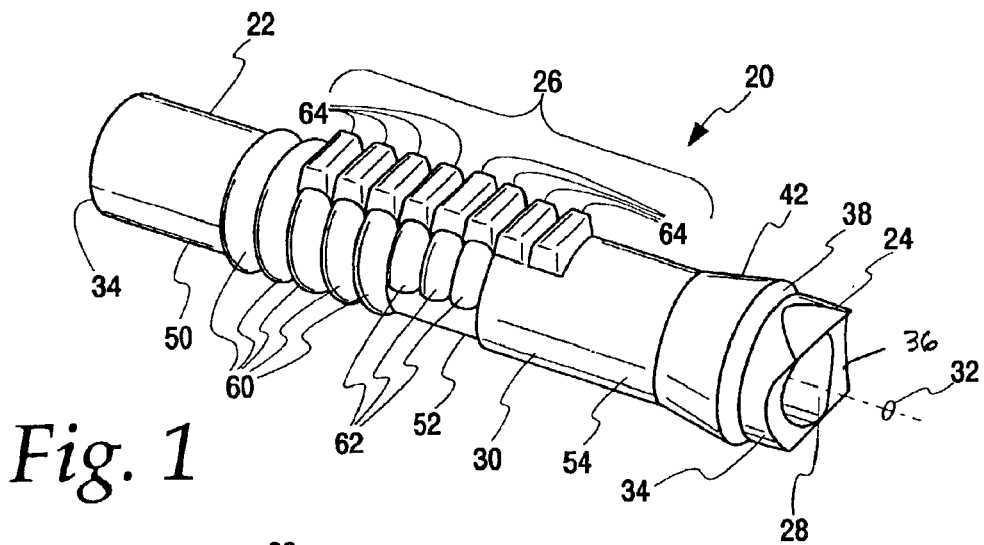
Fig. 1
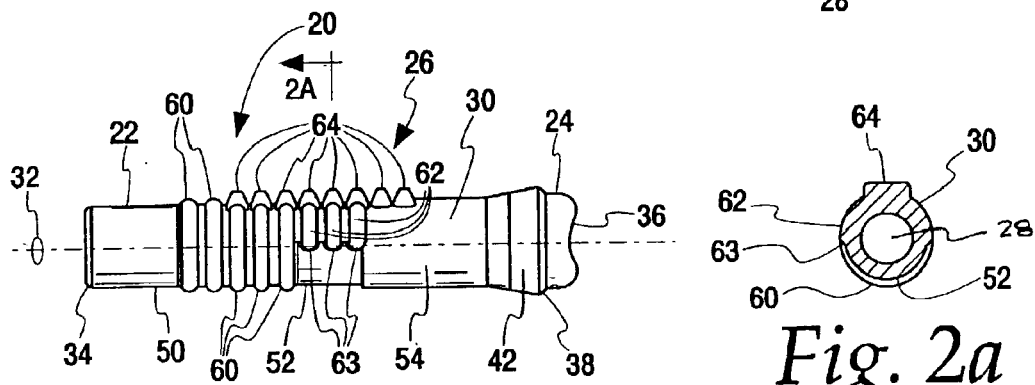
Fig. 2
Fig. 2a
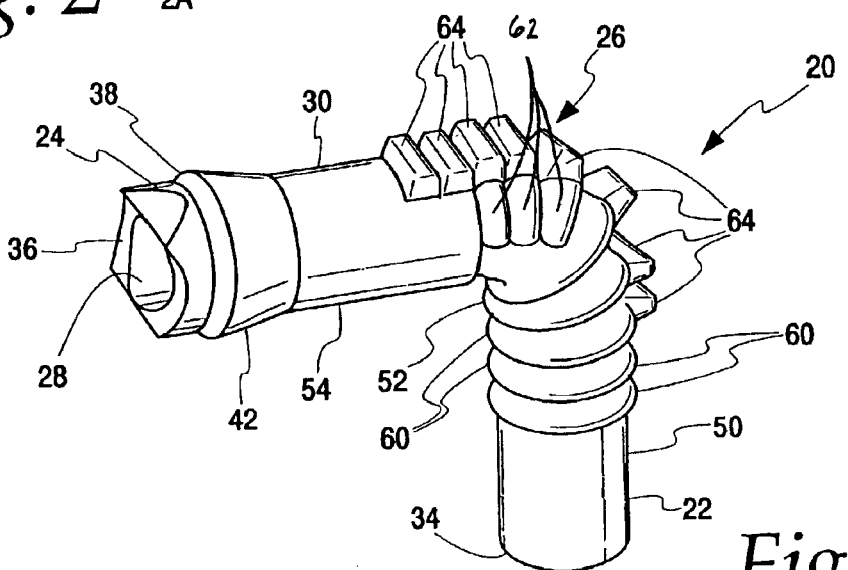
Fig. 3

SHORT MILK TUBE

BACKGROUND OF THE INVENTION

This invention relates generally to milking machines, and more particularly to short milk tubes that provide a conduit between a milking claw and a teat cup liner or an automatic teat dip applicator.

Dairy hygiene is of paramount importance. Keeping cows and other milk producing animals clean and healthy minimizes contamination of milking equipment and the milk. Dairy producing animals such as cows have teats and udders that may be washed before milking to prevent dirt and debris from entering the milking system used to milk cows. In addition, application of antimicrobial teat dips before or after milking can reduce the incidence of mastitis in cows, thus keeping them healthy and producing uninfected milk.

Milking equipment is cleaned regularly to rinse debris and milk residue from the equipment, and to disinfect the equipment so that cows subsequently milked on the same equipment will not be subjected to undue exposure to potentially infectious conditions that can cause mastitis.

Keeping individual animals healthy is important because healthy animals produce more and better milk. Milk produced by cows in a dairy is transferred to a bulk storage tank. Infected milk from one cow can contaminate all of the milk in the bulk tank at considerable loss to the dairyman.

Applying teat dips pre- and post-milking, and back-flushing milking systems therefore are very important to dairy production. Nonetheless, the time and expense of performing these operations is considerable and a number of teat dip applicators have been developed to optimize the quantity of teat dip applied in a minimum amount of time.

One such system has been developed that is attached to the milking cluster and automatically applies a post-milking teat dip to cow teats before the milking cluster is detached from the cow. This system is disclosed in WO 99/66787 to Dietrich and sold by Westfalia-Surge, Inc. of Naperville, Ill. under the "Air Dip" brand name. It saves the time normally needed to hand apply teat dip after the milker unit is detached. By connecting such an applicator to a milking cluster there is added weight that can cause the teat cups to fall from the cow in a manner that damages the teat cups and makes flushing the system more difficult. Also, the load of the applicator can wear down or damage related equipment, particularly the flexible short milk tubes that transport milk away from the cow. In this type of applicator, the teat cup assembly must be back-flushed to rinse out the teat dip before the next cow is milked.

The conventional design of milking units requires connections to conduct air and milk from multiple teat cup assembly outlets to milking claw (manifold) inlets. Often this connection is integral with the teat cup liner fitted within the teat cup to provide an "inflation" that alternately squeezes and releases a teat to induce milking. The inflation responds to alternating vacuum from the dairy's central vacuum line.

In other designs, the connection between the teat cup assembly and the milking claw is made from a separate rubber tube, known as a short milk tube. A number of short milk tube designs are disclosed in U.S. Pat. Nos. 2,341,953; 3,079,891; 4,043,739; 4,090,471; 4,441,454; 4,745,881; 5,007,378; 5,482,004; and 5,572,947.

The requirements of a short milk tube include, providing a fluid-tight conduit for milk and air away from the teat cup assembly and to the milking claw, having and maintaining adequate cross-sectional area to ensure adequate milk flow rate, being flexible enough to allow different teat cup assemblies to adapt to different animals and changing udder size as milk is extracted, resisting damage from the edges of milking claw inlet nipples if the unit is dropped or kicked, and providing a positive connection to an automatic teat dip application valve.

Previously known short milk tubes do not provide the necessary control over the position of teat cup assemblies as they are being detached from cows.

Thus, there is a need for a milking unit that can be used with automatic teat dip applicators to prevent damage to the milking claw when detached from cows and to enable the system to be adequately back-flushed when necessary.

SUMMARY OF THE INVENTION

In accordance with the present invention, there is provided a short milk tube that provides: a fluid-tight conduit for milk and air between the teat cup assemblies and milking claws; adequate cross-sectional area to ensure adequate flow rates; adequate flexibility to adapt to different teat cup assemblies, cows, and udder sizes; resistance to damage from claw inlet nipples when hanging from the claw inlet; a predictable angular position of an automatic teat dip applicator valve when the milker is in the milking and non-milking positions; a vacuum seal when the teat cup assembly is in the non-milking position; control of teat cup position when unattached to a cow to permit adequate drainage of fluids during flushing of an automatic teat dip applicator valve; and prevention against teat cup assemblies from falling inward toward the milking unit claw assembly when detaching from a cow.

A suitable short milk tube in accordance with the present invention therefore provides a milk and air conduit between a teat cup and a milking unit claw, and includes: a teat cup end; a milker claw end; a mid-section spanning between the teat cup end and the milker cup end, and having an internal bore diameter through which milk can flow; and a number of ribs joined to the mid-section and extending at least partially around an annular surface of the mid-section to control the direction in which the short milk tube will bend when in the non-milking position.

There can be ribs that extend completely around the mid-section's exterior annular surface, ribs that extend less than half the way around the mid-section's exterior surface, or ribs of varying length. There can be short ribs joined to longer ribs to further control the direction and degree with which the short milk tube will bend when in the non-milking position.

To provide adequate bending, the ribs are preferably spaced apart, and there can be an "undercut" portion of reduced wall thickness in the mid-section to define a living hinge about which the short milk tube can bend when in the non-milking position.

The teat cup end of the short milk tube can be connected to a teat cup assembly or an automatic teat dip applicator.

The present invention also contemplates an automatic teat dip applicator having connected thereto a short milk tube as described above.

BRIEF DESCRIPTION OF THE DRAWINGS

FIG. 1 is a perspective view of a short milk tube in accordance with the present invention.

FIG. 2 is a side view of the short milk tube of FIG. 1.

FIG. 2a is a cross-sectional view of the short milk tube of FIG. 2 taken along line 2a—2a of FIG. 2.

FIG. 3 is the short milk tube of FIG. 1 in a non-milking or bent position.

DESCRIPTION OF THE PREFERRED EMBODIMENTS

Figure 4:
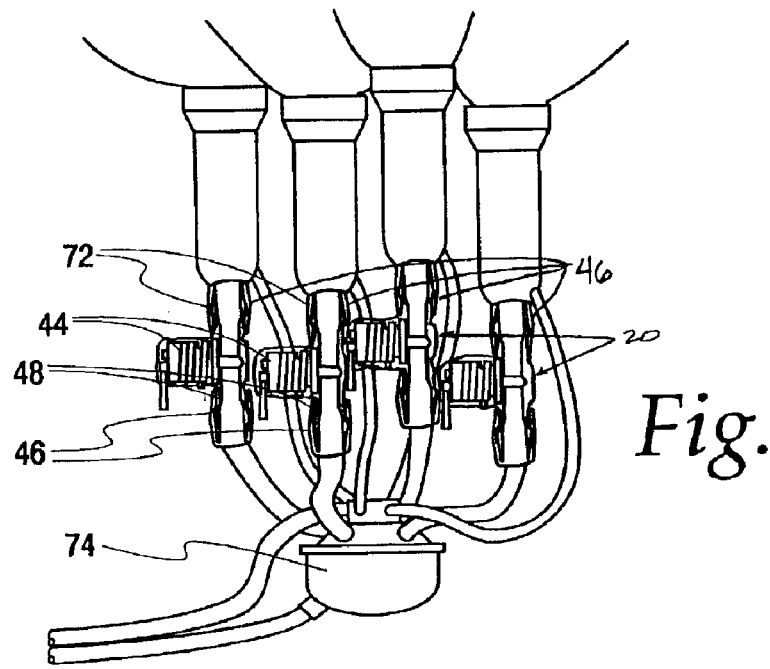
FIG. 4 is a schematic drawing of a short milk tube connected into a milking cluster including a teat cup assembly, an automatic teat dip applicator, and a milking claw.

Illustrated in FIGS. 1, 2, 2a and 3 is a short milk tube 20 in accordance with the present invention. The short milk tube 20 includes a milking claw end 22, a teat cup end 24, and a mid-section 26 spanning between the ends. The short milk tube 20 defines a conduit 28, an exterior surface 30, and a longitudinal axis 32.

The milker claw end 22, (the left end as viewed in FIG. 1) is illustrated as a simply shaped tubular end 34 that mates with a nipple on a milker claw assembly. This connection does not require any reinforcement to the milker claw end 22, but reinforcement could be added, if necessary, to prevent damage from the weight of the teat cup and automatic teat dip applicator. The milker claw end 22 can be any shape necessary to properly mate with an adjacent component in the assembly, whether that is a milker claw or another component in the system.

Figure 5:
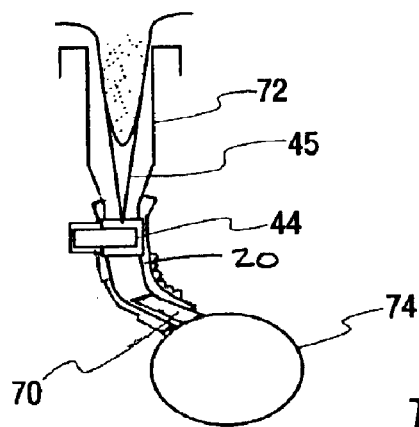
FIG. 5 is a schematic drawing of a single inflation unit, short milk tube, and milker unit from FIG. 4.

The teat cup end 24 (right end as viewed in FIG. 1) is adapted to conform to a nipple (not illustrated) on a teat cup assembly or an automatic teat dip applicator 44 for applying a teat dip 45. (See: Schematic FIG. 5.) The teat cup end 24 includes an arcuate shaped cutout portion 36 to mate with the nipple. In addition, triangular top and bottom reduced thickness portions 38 mate with surfaces adjacent to the nipple. Any shapes of cutout or reduced portions can be used in the present invention to mate with any shape of surface necessary.

Adjacent to the arcuate shaped cut-out portion 36 and the triangular reduced thickness portion 38, there is a frustro-conical portion 42 that provides increased wall thickness in the short milk tube 20 to resist damage from the nipple to which it is connected when the milker is in the non-milking position. When in the non-milking position, the weight of a teat cup assembly and automatic teat dip applicator will tend to bend the short milk tube 20 at a point just below the nipple end. The frustro-conical portion 42 also provides reinforcement for the short milk tube 20 against compression along the longitudinal axis 32, and reduces bending at this location.

Inside the teat cup end 24 there is a ratchet-type flexible connection 46 (Schematic FIG. 4) that engages an enlarged portion of a nipple 48 to form a secure connection.

As viewed in FIGS. 1, 2, and 3, the mid-section 26 includes a first end 50, central undercut portion 52, and second end 54. The first end 50 and the second end 54 have the same wall thickness to provide adequate strength to keep these ends substantially straight when the short milk tube 20 is in the milking position and the non-milking position, and to provide adequate cross-sectional area for milk flow. The central undercut portion 52, has a reduced wall thickness to define a predetermined area of bending about the longitudinal axis 32 when the short milk tube 20 is in the non-milking position (FIG. 3).

The mid-section 26 also includes annular ribs 60, mid-size ribs 62, and short ribs 64. The annular ribs 60 in the embodiment of FIGS. 1 and 2, are slightly spaced apart to permit some bending relative to the longitudinal axis 32. In a preferred embodiment, there are five (5) annular ribs 60 spaced 0.197 inches (0.500 cm) from center to center, but more or less can be used at various spacing depending on the overall length of the short milk tube 20 and the weight of the components being supported.

The mid-size ribs 62 are preferably disposed opposite the central undercut portion 52. In the illustrated embodiment, there are three (3) mid-size ribs 62 spaced apart 0.197 inches (0.500 cm) from center to center and positioned on one side (top side as illustrated). This arrangement of mid-size ribs 62 creates reinforcement against bending toward the ribs 62 and directs bending pressure to the unribbed or undercut portion 52 (bottom side as illustrated in FIG. 2) direction. The interaction of the mid-size ribs 62 with the central undercut portion 52 ensures bending of the short milk tube 20 in the desired direction.

The mid-size ribs 62 preferably terminate with a fillet 63 that eases the transition from the mid-size ribs 62 to the undercut portion 52. (FIGS. 2 and 2a.)

The short ribs 64 are preferably tapered outwardly and straight along their outside (top) edge. They are slightly spaced apart and disposed in a line on one side of the mid-section 26 (top side as viewed in FIG. 1) of the short milk tube 20. The short ribs 64 extend at least partially across the mid-section's 26 first end 50, central undercut portion 52, and second end 54.

On the first end 50, the short ribs 64 are joined to the top of the annular ribs 60. On the central undercut portion 52, the short ribs 64 are joined to the mid-size ribs 62. On the second end 54, the short ribs 64 are joined to an annular outer surface 30. Preferably, there are eight (8) short ribs spaced 0.197 inches (0.500 cm) from center to center. The outer annular surface 30 can be formed into other shapes.

In this embodiment (FIGS. 1, 2, and 3), the short milk tube 20 has: a 0.8 inch (2.03 cm) diameter to the outside of the annular ribs 60, a 0.368 inch (0.934 cm) radius to the outside edge of the short milk ribs 64, a 0.348 inch (0.884 cm) radius at the outside of the central undercut portion 52, and a 0.906 inch (2.301 cm) diameter at the widest part of the frustro-conical portion 42.

The above-described arrangement of short ribs 64 provides a "spine" or line of reinforcement that directs bending forces toward the opposite side of the short milk tube 20 to make a predictable location for bending of the short milk tube 20 when moving between the milking and non-milking position. This predictable bending action essentially makes the short milk tube 20 act as a "living hinge" in addition to providing a milk and air conduit.

This controlled bending defines the direction in which teat cups and automatic teat dip applicator injectors 44 (FIG. 6) fall when detached from a cow. These components will fall outward and away from the center of milker claw 74, as illustrated schematically in FIG. 6. At the same time, the short ribs 64 provide reinforcement against the weight of these same components.

Figure 6:
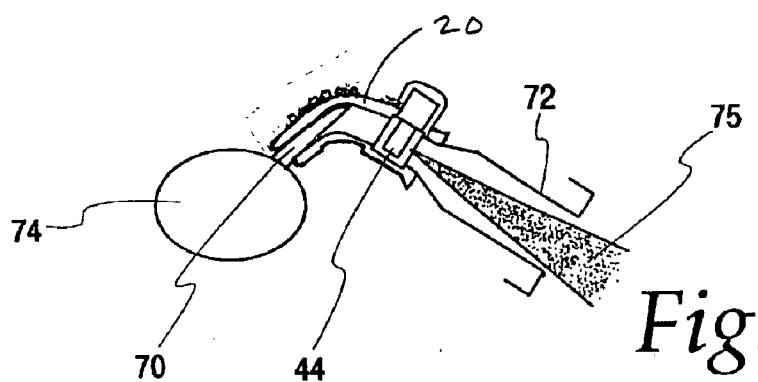
FIG. 6 is a schematic view of a teat cup assembly, teat dip applicator, and milking claw in a back-flush position.

By defining the location of the bending in this way, it is also possible to consistently control the degree of bending in the short milk tube 20. Controlling the degree of bending permits an approximately 90° bend in the milk tube 20 when in the non-milking position (FIGS. 3 and 6). By doing so, the conduit 28 through the short milk tube 20 is substantially closed to provide a seal between the teat cup assembly 72 and a nipple 70 of the milker claw 74. (FIG. 6.) In other words, the controlled bending of the short milk tube 20 creates a seal between the milker claw end 22 and the teat cup end 24. In this manner, the teat cup assembly 72 can be back-washed and drained (FIG. 6) after operation of the automatic teat dip applicator without the risk of back-flushing fluids 75 and residue migrating into the milk machine claw 74 and dairy milk lines.

The ribs 60, 62, and 64 are all preferably molded integrally with the short milk tube 20, but they could be separate components assembled together by gluing or otherwise. In addition, the number, size, position, and shape of ribs is illustrated as a preferred embodiment, but with the teachings herein, one skilled in the art could modify these features to accommodate a variety of short milk tube materials, length, wall thickness, and weight of components to be supported.

Figure 7:
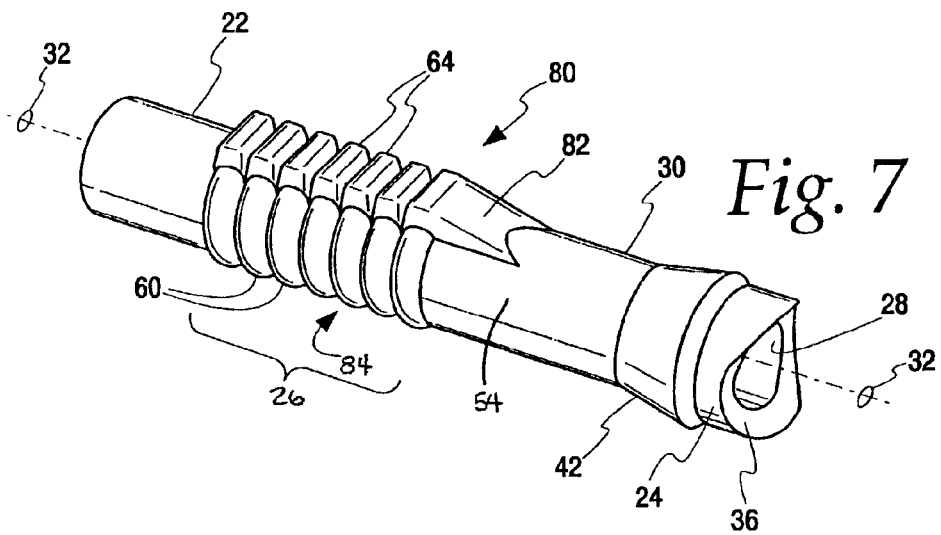
FIG. 7 is a first alternate embodiment of a short milk tube in accordance with the present invention.

In FIG. 7, there is depicted an alternate embodiment of a short milk tube 80 in accordance with the present invention. This short milk tube 80 has a milker claw end 22, a teat cup end 24, a mid-section 26, a conduit 28, an exterior surface 30, and a longitudinal axis 32 in substantially the same arrangement as the short milk tube 20 described above.

The teat cup end 24 has no triangular cutout portions, but there is a frustro-conical portion 42 and an arcuate shaped cutout as described above. This alternate shape is able to accommodate the shape of an automatic teat dip applicator nipple.

The mid-section 26 includes no undercut portion or mid-size ribs. Instead, there are annular ribs 60 and short ribs 64. In addition, this short milk tube 80 includes a ramp 82 leading upward from the exterior surface 30 to the short rib closest to the teat cup end 24. This feature resists bending and twisting the second end 54 of the mid-section 26 and forces bending in the ribbed section 84.

Figure 8:
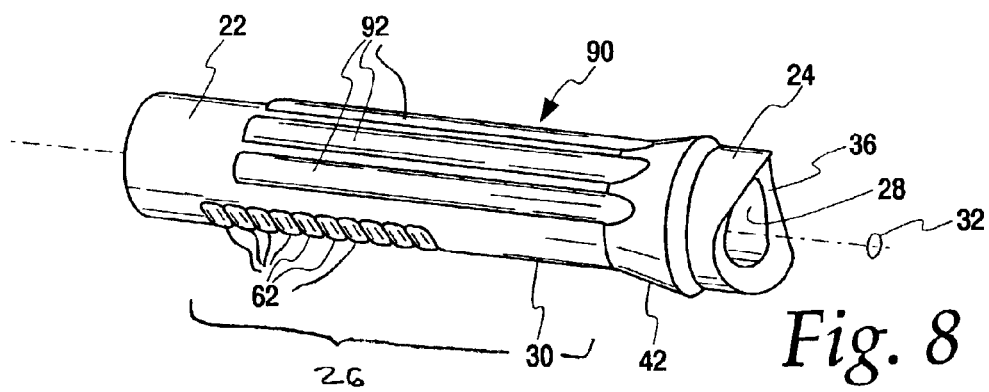
FIG. 8 is a second alternate embodiment of a short milk tube in accordance with the present invention.

In FIG. 8, there is depicted a second alternate embodiment of a short milk tube 90 in accordance with the present invention. This short milk tube 90 has a milker claw end 22, a teat cup end 24, a mid-section 26, a conduit 28, an exterior surface 30, and a longitudinal axis 32 in substantially the same arrangement as the short milk tube 20 described above.

The teat cup end 24 has no triangular cutout portions, but there is a frustro-conical portion 42 and an arcuate shaped cutout 36 as described above. This alternate shape is able to accommodate the shape of an automatic teat dip applicator nipple.

The mid-section 26 includes no undercut portion, annular ribs, or short ribs as described in the previous embodiment. Instead, this short milk tube 90 includes mid-size ribs 62 on the underside of the mid-section 26 and longitudinal ribs 92 spanning from the frustro-conical portion 42 to nearly the full length of the mid-section 26. This structure eliminates a split cavity when molded, but it provides the predictable bending features described above. This short milk tube 90 will bend at and in the direction of the mid-sized ribs 62.

Figure 9:
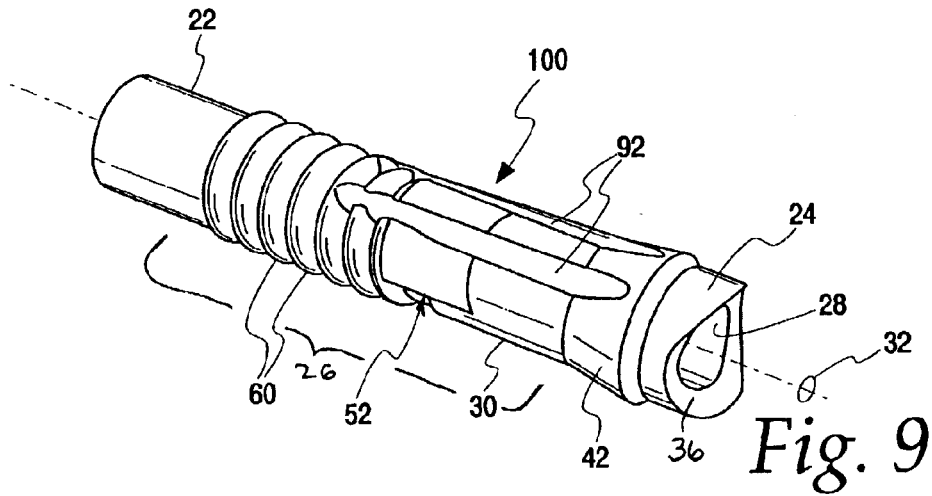
FIG. 9 is a third alternate embodiment of a short milk tube in accordance with the present invention.

In FIG. 9, there is depicted a third embodiment of a short milk tube 100, in accordance with the present invention. This short milk tube 100 has a milker claw end 22, a teat cup end 24, a mid-section 26, a conduit 28, an exterior surface 30, and a longitudinal axis 32 in substantially the same arrangement as the short milk tube 20 described above.

The teat cup end 24 has no triangular cutout portions, but there is a frustro-conical portion 42 and an arcuate shaped cutout 36 as described above. This alternate shape is able to accommodate the shape of an automatic teat dip applicator nipple.

This short milk tube 100, includes annular ribs 60, longitudinal ribs 92, and an undercut portion 52. The annular ribs 60 support the milk tube 100 near the milking claw to prevent collapse of the conduit 28 and a cushion if the unit is dropped to prevent the short milk tube from being dropped.

The semi-circular undercut 52 is centrally located to define a living hinge where the tube 100 will bend to create a seal between the teat cup assembly 72 and the milk machine claw 74 when in the non-milking position. In other words, the controlled bending of the milk tube 100 creates a seal between the milker claw end 22 and the teat cup end 24. The longitudinal ribs 92 prevent bending in the opposite direction.

A preferred material for a short milk tube is nitrile rubber compound in compliance with 21 C.F.R. Part 177.2600. The inside diameter should be approximately 0.400 inches (1.02 cm), and the outside diameter will vary as described above relative to the ribs, undercuts and frustro-conical portion 42, but the milk claw end 24 is approximately 0.700 inches (1.79 cm) in outside diameter.

The foregoing detailed description of drawings is provided for clearness of understanding only and is not intended to add unnecessary limitations to the following claims.

What is claimed is:

1. A short milk tube for providing a milk and air conduit between a teat cup and a milker claw, the short milk tube comprising:

a teat cup end;

a milker claw end;

a mid-section spanning between the teat cup end and the milker claw end, and having an internal bore through which fluid can flow; and a plurality of annular ribs joined to the mid-section and extending at least partially around an annular surface of the mid-section; and an undercut portion of reduced tube wall thickness disposed opposite a portion of full tube wall thickness; in the mid-section such that the short milk tube is asymmetrical about a longitudinal axis and about which the short milk tube bends about the undercut portion when in a non-milking position.

2. The short milk tube of claim 1, wherein the undercut portion extends at least partially around the annular surface of the mid-section.

3. The short milk tube of claim 1, wherein the ribs are joined to an exterior surface of the mid-section.

4. The short milk tube of claim 1, wherein the ribs are formed integrally with the mid-section.

5. The short milk tube of claim 1, and further comprising:

a plurality of spaced apart annular ribs joined to an exterior surface of the mid-section.

6. A short milk tube of claim 1, wherein the ribs extend along about one half of an annular exterior surface of the mid-section.

7. The short milk tube of claim 1, wherein the teat cup end is shaped to interface with an automatic teat dip applicator.

8. The short milk tube of claim 1, wherein the short milk tube is bendable about the undercut portion to form a seal between the teat cup end and the milker claw end when in the non-milking position.

9. An automatic teat dip applicator for applying teat dip via a teat cup assembly on a milking machine, and comprising a short milk tube for providing a conduit between the teat dip applicator and a milker claw, the short milk tube comprising:

a teat cup end;

a milker claw end;

a mid-section spanning between the teat cup end and the milker claw end, and having an internal bore diameter through which fluid can flow;

a plurality of ribs joined to the mid-section and extending at least partially around an annular surface of the mid-section; and an undercut portion of reduced tube wall thickness disposed opposite a portion of full tube wall thickness in the mid-section such that the short milk tube is asymmetrical about a longitudinal axis and the short milk tube bends about the undercut portion when in a non-milking position.

10. The short milk tube of claim 9, wherein the undercut portion extends at least partially around the annular surface of the mid-section.

11. The short milk tube of claim 9, wherein the ribs are joined to an exterior surface of the mid-section.

12. The short milk tube of claim 9, wherein the ribs are formed integrally with the mid-section.

13. The short milk tube of claim 9, and further comprising:

a plurality of spaced apart annular ribs joined to an exterior surface of the mid-section.

14. A short milk tube of claim 9, wherein the ribs extend along about one half of an annular exterior surface of the mid-section.

15. The short milk tube of claim 9, wherein the teat cup end is shaped to interface with the automatic teat dip applicator.

16. The short milk tube of claim 9, wherein the short milk tube is bendable at the undercut portion to form a seal between the teat cup end and the milker claw end in the non-milking position.

17. A short milk tube for providing a milk and air conduit between a teat cup and a milker claw, the short milk tube comprising:

a teat cup end;

a milker claw end;

a mid-section spanning between the teat cup end and the milker claw end, and having an internal bore through which fluid can flow;

a plurality of annular ribs joined to the mid-section and extending around an annular surface of the mid-section; and a short rib joined to at least one side of the annular ribs such that the short milk tube is asymmetrical about a longitudinal axis.

18. The short milk tube of claim 17, wherein the ribs are joined to an exterior surface of the mid-section.

19. The short milk tube of claim 17, wherein the teat cup end is adapted to interface with an automatic teat dip applicator.

20. A short milk tube for providing a milk and air conduit between a teat cup and a milker claw, the short milk tube comprising:

a teat cup end;

a milker claw end;

a mid-section spanning between the teat cup end and the milker claw end, and having an internal bore through which fluid can flow; and an undercut portion of reduced tube wall thickness disposed opposite a portion of full tube wall thickness in the mid-section such that the short milk tube is asymmetrical about a longitudinal axis and the short milk tube bends about the undercut portion when in a non-milking position.

21. The short milk tube of claim 20, wherein the undercut portion extends at least partially around the annular surface of the mid-section.

22. The short milk tube of claim 20, wherein the ribs are joined to an exterior surface of the mid-section.

23. The short milk tube of claim 20, wherein the ribs are formed integrally with the mid-section.

24. The short milk tube of claim 20, and further comprising:

a plurality of spaced apart annular ribs joined to an exterior surface of the mid-section.

25. A short milk tube of claim 20, wherein the ribs extend along about one half of an annular exterior surface of the mid-section.

26. The short milk tube of claim 20, wherein the teat cup end is shaped to interface with an automatic teat dip applicator.

27. The short milk tube of claim 20, wherein the short milk tube is bendable about the undercut portion to form a seal between the teat cup end and the milker claw end when in the non-milking position.

* * * * *